United States Patent
Daynard

[11] 3,841,336
[45] Oct. 15, 1974

[54] PACER BATTERY FAILURE DETECTION CIRCUIT

[75] Inventor: Richard F. Daynard, Chelmsford, Mass.

[73] Assignee: American Optical Corporation, Southbridge, Mass.

[22] Filed: Dec. 14, 1973

[21] Appl. No.: 425,036

[52] U.S. Cl. ............... 128/419 D, 320/48, 331/65, 331/111
[51] Int. Cl. ............................................. A61n 1/36
[58] Field of Search ........ 128/419 P, 421, 422, 423; 320/48; 331/65, 111; 340/206; 328/132

[56] References Cited
UNITED STATES PATENTS

| | | | |
|---|---|---|---|
| 3,426,748 | 2/1969 | Bowers | 128/419 P |
| 3,621,469 | 11/1971 | Bauer | 331/111 |
| 3,756,246 | 9/1973 | Thaler et al. | 128/419 P |
| 3,774,619 | 11/1973 | Goldberg | 128/419 P |
| 3,777,762 | 12/1973 | Nielsen | 128/419 P |
| 3,789,854 | 2/1974 | Lee | 128/419 P |

*Primary Examiner*—William E. Kamin
*Attorney, Agent, or Firm*—J. Wall; W. C. Nealon; H. R. Berkenstock, Jr.

[57] ABSTRACT

There is disclosed a conventional-type demand pacer to which there is added a voltage-controlled oscillator whose frequency is dependent upon the magnitude of the pacer battery voltage. The oscillator is turned on, under external control, when the pacer is switched to the continuous mode. The oscillator then causes pacer pulses to be generated in groups, with a short time interval separating groups. The number of pulses in each group is equal to the number of batteries which are still in service. By counting the number of pulses in each group, for example, by using a de-tuned radio, the number of good batteries remaining in the pacer can be determined.

8 Claims, 3 Drawing Figures

PATENTED OCT 15 1974  3,841,336

PACER BATTERY FAILURE DETECTION CIRCUIT

This invention relates to implantable pacers, and more particularly to detection circuits for facilitating a determination of the number of batteries in the pacer which have failed.

A conventional implantable demand pacer includes several batteries, for example, five, connected in series. It is well known in the art that the voltage of each battery usually remains constant until the battery suddenly fails, at which time its voltage contribution to the total potential is negligible. In other words, the total pacer voltage supply decreases in incremental steps, each 20 percent of the initial voltage.

After two or three of the batteries have failed, the pacer is usually replaced. But until two or three batteries have failed, it is important that the pacer rate remain constant. This is achieved by employing a timing circuit whose frequency of operation is not dependent upon battery voltage.

A conventional demand pacer includes a magnetically-actuated reed switch for converting the operation to a continuous mode. When the external magnet is brought near the patient's chest, the reed switch closes and the pacer switches to the continuous mode. In order to determine how many batteries have failed, for example, some pacer circuits are arranged to operate in the continuous mode such that their rates of operation change gradually as their battery voltages fall. If such a pacer is switched to the continuous mode and the EKG signal of the patient is examined on an oscilloscope, the pacer pulses can be seen. Their rate can be measured, and the battery voltage can thus be determined.

However, in order to determine the battery voltage the initial rate must be known. It is the change in rate that is proportional to a change in voltage. If the initial rate is not known (for example, to a physician treating an unconscious patient who is a stranger), it is not possible to determine how much the voltage has changed because only the rate can be determined, not the change in rate. For example, a slow rate may really represent a small voltage change if the initial rate was also slow.

It is an object of my invention to provide an implantable pacer for which the exact number of failed batteries may be readily determined without knowledge of the previous rate history.

Briefly, in accordance with the principles of my invention, I provide a voltage-controlled oscillator in the pacer circuit. The nominal period of the oscillator is 5.5 times the initially set inter-pulse interval, but the oscillator period of operation decreases in proportion to the number of failed batteries. The oscillator is turned on when the pacer is switched to the continous mode of operation with the closing of the reed switch.

At the end of each period of the oscillator, the timing circuit of the pacer is reset. The effect of resetting the timing circuit at the end of each oscillator period is that the pacer pulses are generated in groups, with the pre-set inter-pulse interval separating successive pulses, but with successive groups of pulses being separated by a time interval slightly longer than the pre-set interpulse interval. And because the oscillator period is dependent upon the battery voltage, the number of pacer pulses in each group equals the number of remaining operative batteries. The number of pulses in each group can be determined by placing a de-tuned radio near the patient. The pacer pulses can actually be heard on the radio and the human ear can distinguish the number of pulses in each group even though the time spacing between successive groups is only slightly longer than the time interval between successive pulses within a group.

Further objects, features and advantages of my invention will become apparent upon consideration of the following detailed description in conjunction with the drawing, in which.

Figure 1:
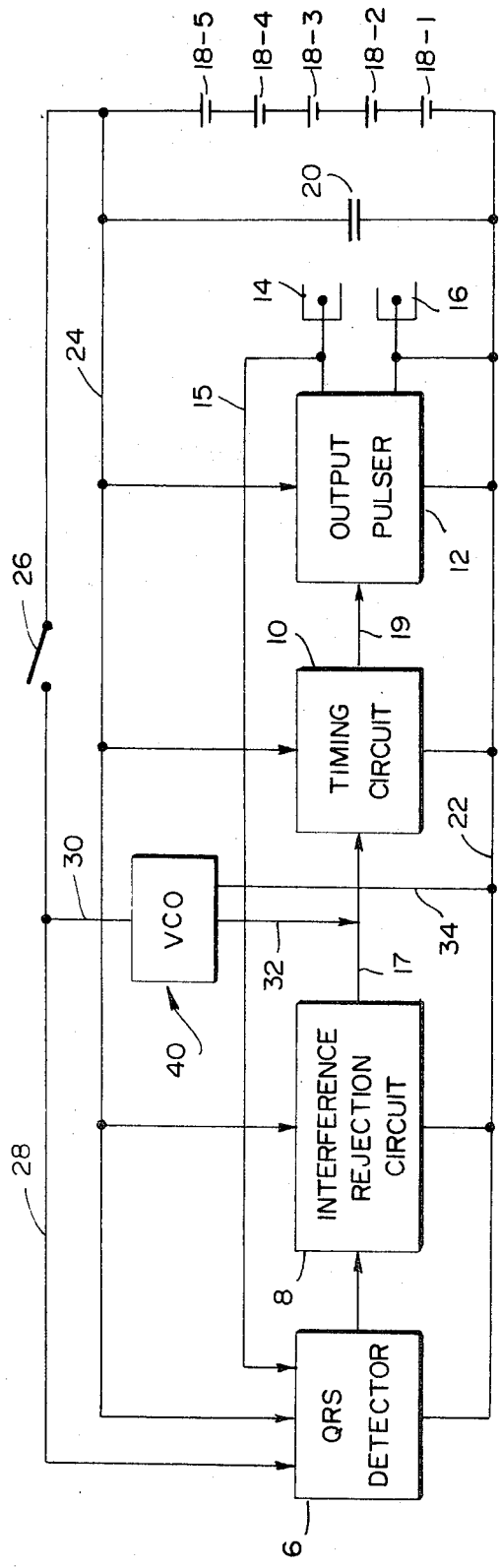
FIG. 1 depicts schematically a conventional implantable demand pacer to which there is added a voltage controlled oscillator shown by the numeral 40 in accordance with the principles of my invention.

With the exception of voltage-controlled oscillator (VCO) 40 in FIG. 1, the circuit depicts a conventional implantable demand pacer. A pacer of this type is disclosed in detail, for example, in Berkovits application Ser. No. 214,218, filed on Dec. 30, 1971, now U.S. Pat. No. 3,757,791 and entitled "Synchronized Atrial and Ventricular Pacer." (Although the pacer disclosed in the Berkovits application provides atrial stimulation as well as ventricular stimulation, if the circuitry required for atrial stimulation is omitted, what is left is a demand pacer for ventricular stimulation of the type depicted in FIG. 1.)

The pacer of FIG. 1 includes five batteries 18-1 through 18-5 connected in series, with filter capacitor 20 being connected in parallel with them. A common ground conductor 22 and potential bus 24 are used for powering the four circuits 6, 8, 10 and 12. Output pulser 12 is connected to two electrodes 14, 16. When a pacer pulse is generated, current flows from the output pulser, through the two electrodes and the patient's heart. Electrode 14 is coupled via a conductor 15 to QRS detector 6. When the heart beats spontaneously, an electrical signal appears on conductor 15, which signal is detected by QRS detector 6 for the purpose of preventing the generation of the next pulse which would otherwise be generated by the pacer.

However, if signals are detected on conductor 15 at a fast rate, such signals may be due to electrical interference rather than to the beating of the patient's heart. For this reason, the output of detector 6 is extended to interference rejection circuit 8 which distinguishes between electrical interference and true spontaneous beats. It is only if a true spontaneous beat is detected that a pulse is applied on conductor 17 to timing circuit 10.

The timing circuit generates pulses at a rate of 1/T where T is the inter-pulse interval. Whenever a pulse is generated, it is extended over conductor 19 to output pulser 12 for controlling the generation of a stimulating pulse. However, whenever a pulse appears on conductor 17, the timing circuit resets and starts its timing interval once again without first controlling the generation of an output pulse. In this way, if a true spontaneous beat is detected, a pacer pulse is not generated. It is only when a time interval of T seconds has elapsed since the last beat (either spontaneous or stimulated)

that the timing circuit pulses conductor 19 so that a stimulating pulse can be generated.

Reed switch 26, which is actuated by bringing an external magnet adjacent to the patient's chest, is provided for extending the battery potential via conductor 28 to the QRS detector 6. When the reed switch is closed, the QRS detector is turned off. In such a case, timing circuit 10 continues to operate and pacer pulses are generated on a continuous basis at a rate of 1/T per second; the pacer is operated in the continuous mode.

In accordance with the principles of the invention, VCO 40 is added to the pacer circuit of FIG. 1 as shown. The VCO is powered over conductor 30 from the potential on bus 24 when reed switch 26 is closed, that is, the VCO is turned on only when the pacer is operated in the continuous mode under the external control of a physician. Conductor 34 is the ground conductor for the VCO. The VCO generates pulses on output conductor 32, which pulses are extended to the input of timing circuit 10 and serve the same function as pulses on conductor 17 from interference rejection circuit 8. Each pulse from the VCO on conductor 32 resets the timing circuit so that the next pacer pulse which would otherwise be generated is inhibited and a new timing interval begins.

The VCO operates linearly and is designed so that the duration of each timing interval is 5.5T, where T is the inter-pulse interval of the pacer when it is operated in the continuous mode. When one of the pacer batteries has failed and the total pacer potential has dropped to 80 percent of its initial value, the period of the VCO drops to (0.8) (5.5 percent) or 4.4T. Similarly, when two of the batteries have failed, the period of the VCO drops to (0.6) (5.5T) or 3.3T. Similar remarks apply for each 20 percent drop in the initial battery voltage as successive batteries fail.

Figure 3:
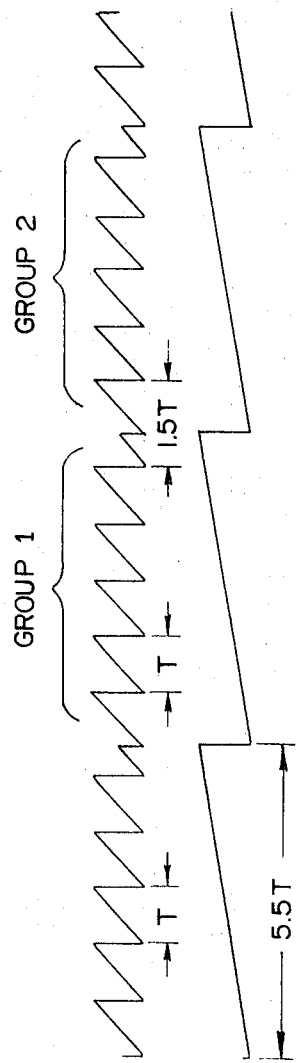
FIG. 3 depicts timing waveforms which will facilitate an understanding of the operation of the pacer of FIG. 1.

The operation of the circuit can be best understood by considering the timing diagram of FIG. 3. The upper waveform depicts the timing of circuit 10. The lower waveform depicts the timing of the VCO. Before the pacer is switched to the continuous mode, timing circuit 10 starts a timing interval with each beat of the patient's heart. If a spontaneous beat is detected before T seconds have elapsed, the timing circuit starts a new cycle without controlling the generation of a stimulating pulse. On the other hand, if T seconds have elapse subsequent to the last heartbeat without the appearance of a spontaneous beat, then the timing circuit controls the generation of a stimulating pulse and starts a new timing interval.

When reed switch 26 is first closed, there may be no synchronism between the VCO and timing circuit 10. Thus, the lower waveform in FIG. 3, at the left-hand side, shows the VCO timing waveform out of synchronism with the waveform which depicts the operation of timing circuit 10. The period of timing circuit 10 is T seconds and the period of the VCO is 5.5T seconds. As soon as the VCO has timed the first 5.5T interval, it resets (shown by the negative step in the lower waveform) and a new timing cycle begins. But since a pulse is at this time applied to conductor 32, timing circuit 10 also resets. The timing cycle in progress is terminated abruptly and a new cycle begins. As shown in the upper waveform of FIG. 3, the cycle in which synchronism is achieved is terminated shortly after it started. Exactly where the timing cycle is terminated is not important. What is important is that following the first cycle of the VCO, the VCO and timing circuit 10 remain in synchronism.

As the VCO cycle proceeds, as shown by the middle sawtooth in the lower waveform, timing circuit 10 goes through 5.5 cycles. In the middle of the sixth cycle, the VCO resets, and the pulse on conductor 32 resets timing circuit 10. At this time, timing circuit 10 is once again synchronized to the VCO. Since the timing circuit requires another T seconds before its new cycle is completed, there are 1.5T seconds between the successive pacer pulses which follow the end of the VCO cycle. The net result is that five pulses are generated, with successive pulses separated by T seconds, following which 1.5T seconds elapse before another group of five pacer pulses is generated. The pacer pulses thus occur in groups of five, and this is an indication that all five batteries are still operative. The pulse groupings can be observed on an oscilloscope, but even if an oscilloscope is not available the number of pulses in each group can be determined. If a de-tuned radio is placed near the patient, the pacer pulses can actually be "heard" over the radio. Although the time spacing between groups is only 50 percent greater than the timing spacing between successive pulses within a group, the ear can discern the difference. By counting five pulses in each group as they are heard, it can be verified that all of the batteries are operative.

Suppose, however, that one of the batteries has failed. Since the duration of a VCO cycle of operation is directly proportional to the battery voltage, when the battery voltage drops to 80 percent of its initial value, the period of the VCO drops to (0.8) (5.5T) or 4.4T seconds. Assuming that the pacer is designed so that its rate in the continous mode remains constant independent of voltage, only four pacer pulses appear in each group, with successive groups being separated by 1.4T. After two of the pacer batteries have failed, the VCO cycle is 3.3T seconds in duration, only three pulses appear in each group to indicate that there are only three good batteries left, and 1.3T seconds separate successive groups of pulses. Finally, after three batteries have failed, the duration of the VCO cycle is only 2.2T seconds, only two pulses appear in each group, and successive groups of pulses are separated by 1.2T seconds. When such a condition is detected, it is time to replace the pacer.

It will be recalled that in some conventional implantable pacers, the pacer rate changes in proportion to voltage changes when the pacer is operated in the continous mode. This is the conventional mechanism for informing the physician that two of the batteries have failed. The technique of my invention can be used even with a pacer whose rate in the continuous mode changes with battery failures.

To explain this, an illustrative example will be considered. Suppose that the pacer is designed so that when it is operated in the continuous mode with five good batteries, T is equal to 800 milliseconds, but that for each battery failure the pacer rate increases such that T decreases by a 40-millisecond increment. It will be further assumed that the initial period of the VCO is 4,600 milliseconds (when all five batteries are operative). It will be noted that 5.5T in this case (where T is the original pacer period) is only 4,400 milliseconds, but it is to be emphasized that the initial period of the VCO need not be exactly 5.5T seconds; the initial period must be longer than 5T (and less than 6T), in the case of a five battery pacer, and the exact duration of the initial VCO cycle is not critical.

If all five batteries are operative, when the pacer is switched to the continuous mode five pacer pulses are generated within the first 4,000 milliseconds of each cycle of the VCO operation. Another cycle of timing circuit 10 then begins, but after only 600 milliseconds of this 800 millisecond cycle have elapsed, the VCO cycle terminates and the timing circuit is reset. The net result is that five pacer pulses are generated, with 800 milliseconds separating the pulses within the group, and with 1,400 milliseconds separating the last pulse in the group from the first pulse in the succeeding roup.

After one battery has failed, the VCO cycle drops to (0.8) (4,600) or 3,680 milliseconds. Since the duration of each cycle of timing circuit 10 is now only 760 milliseconds, there are four complete cycles of the timing circuit (which require 3,040 milliseconds) within each 3,680-millisecond cycle of the VCO. Consequently, there are four pulses in each group separated by 760 milliseconds, with succeeding groups being separated by 640+760 or 1,400 milliseconds.

After two batteries have failed and the VCO cycle has been reduced to (0.6)(4,600) or 2,760 milliseconds, the duration of each cycle of timing circuit 10 decreases to 720 milliseconds. In such a case, within each 2,760-millisecond cycle of the VCO, three 720-millisecond cycles of timing circuit 10 can take place (leaving over 600 milliseconds at the end of the VCO cycle). Consequently, there are three pulses in each group with successive pulses being separated by 720 milliseconds, and with 600+720 or 1,320 milliseconds separating the last pulse in one group from the first pulse in the next. This break in rhythm is sufficient for determining that there are only three pulses in each group.

After three batteries have failed, the duration of the VCO cycle drops to (0.4)(4,600) or 1,840 milliseconds, and the duration of each cycle of timing circuit 10 decreases to 680 milliseconds. Within each 1,840-millisecond VCO cycle, timing circuit 10 controls the generation of two pacer pulses during the first 1,360 milliseconds. This leaves 480 milliseconds at the end of each VCO cycle so that the two pulses in each group are separated by 680 milliseconds, while the last pulse of one group and the first of the next are separated by 480+680 or 1,160 milliseconds. This is still sufficient to distinguish the two pulses in each group.

Thus, it is apparent that the addition of a VCO to a conventional implantable pacer circuit for the purpose of controlling the generation of pacer pulses in groups, with the number of pulses in each group being equal to the number of remaining good batteries, can be used even in those cases where the rate in the continuous mode increases with battery failure.

Figure 2:
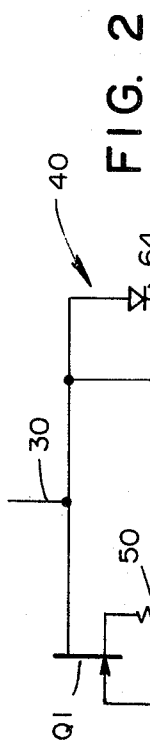
FIG. 2 depicts a preferred voltage-controlled oscillator for use in the pacer of FIG. 1.

FIG. 2 depicts an illustrative VCO which can be used as block 40 in the circuit of FIG. 1. As shown in FIG. 1, when reed switch 26 is closed, the potential on bus 24 is applied to conductor 30 to power the VCO. Conductor 34 is coupled to ground conductor 22, and conductor 32 is extended to the input of timing circuit 10, just as conductor 17 is extended to the input of the timing circuit.

Transistor Q1 and resistor 50 comprise a conventional constant current source, with current flowing through resistor 50, capacitor 54 and resitor 60 to grounded conductor 34. Transistors Q2 and Q3 are arranged in a four layer diode configuration, with the base of transistor Q2 being tied to the junction of one of diodes 64 and resistor 62. The diodes and the resistor serve to provide a reference potential at the base of transistor Q2 which changes with the battery voltage. After capacitor 54 has charged to a level high enough to control conduction in transistors Q2 and Q3, the capacitor discharges through resistor 52 and the two transistors. At the same time that the capacitor discharges through the transistors, there is additional current flow from conductor 30 through transistor Q3, resistor 56 and diode 58 to conductor 32. This current serves as the pulse for resetting timing circuit 10. Diode 58 is provided to isolate the VCO from the rest of the pacer circuit, so that pulses on conductor 17 from interference rejection circuit 8 are not extended to the VCO. As soon as capacitor 54 has discharged (typically, this requires only a few milliseconds), transistors Q2 and Q3 turn off and the capacitor starts to charge once again.

The capacitor charges at a constant rate since the current for charging the capacitor comes from a constant current source. It is for this reason that the voltage across capacitor 54 is a sawtooth waveform as shown in FIG. 3. But the voltage required for fire transistors Q2 and Q3 depends upon the voltage at the base of transistor Q2, and this in turn is a function of the battery potential on conductor 30. Consquently, as the battery potential drops, capacitor 54 has to charge to a lesser degree before transistors Q2 and Q3 are fired. Since the capacitor charges linearly, it is apparent that the decrease in the cycle of the VCO is directly proportional to the decrease in the battery potential. It is to be understood that the VCO depicted in FIG. 2 is only illustrative of a class of circuits which can be used for the same purpose.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

What I claim is:

1. An implantable heart pacer comprising a plurality of serially connected batteries, electrode means for connection to a patient's heart, pulser means for generating and applying stimulating pulses to said electrode means, first timing means for operating continuously and repetitively and for controlling the generation of stimulating pulses at predetermined time intervals after the resetting thereof, said batteries serving to power said pulser means and said first timing means, second timing means for operating in repetitive cycles and including means for resetting said first timing means following each of said repetitive cycles, said second timing means being powered by said batteries when enabled and including means for shortening its cycle of operation in proportion to the series potential of said batteries, and means responsive to external actuation for enabling said second timing means.

2. An emplantable heart pacer in accordance with claim 1 wherein the cycle of operation of said second timing means has a duration of more than N, but less than N+1, times the duration of the cycle of operation of said first timing means, where N is the number of serially connected batteries when all of said batteries are operating.

3. An implantable heart pacer in accordance with claim 2 wherein the duration of the cycle of operation of said second timing means is reduced as successive ones of said batteries fail such that the duration of the cycle of operation of said second timing means is at all times greater than N', but less than N'+1, times the duration of the cycle of operation of said first timing means, where N' is equal to the number of good batteries remaining in the pacer, as long as the pacer remains operative.

4. An implantable heart pacer in accordance with claim 1 wherein the duration of the cycle of operation of said second timing means is reduced as successive ones of said batteries fail such that the duration of the cycle of operation of said second timing means is at all times greater than N', but less than N'+1, times the duration of the cycle of operation of said first timing means, where N' is equal to the number of good batteries remaining in the pacer, as long as the pacer remains operative.

5. An implantable heart pacer in accordance with claim 4 further including means for normally operating the pacer in a demand mode, and means responsive to said external actuation for converting the pacer to operate in a continuous mode while also enabling said second timing means.

6. An implantable heart pacer in accordance with claim 5 wherein the period of operation of said first timing means decreases as the total voltage of said serially connected batteries decreases.

7. An implantable heart pacer in accordance with claim 1 further including means for normally operating the pacer in a demand mode, and means responsive to said external actuation for conventing the pacer to operate in a continuous mode while also enabling said second timing means.

8. An implantable heart pacer in accordance with claim 7 wherein the periof of operation of said first timing means decreases as the total voltage of said serially connected batgeries decreases.

* * * * *